United States Patent
Beisele et al.

(10) Patent No.: US 12,516,188 B2
(45) Date of Patent: Jan. 6, 2026

(54) STORAGE STABLE AND CURABLE RESIN COMPOSITIONS

(71) Applicant: Huntsman Advanced Materials Licensing (Switzerland) GmbH, Basel (CH)

(72) Inventors: Christian Beisele, Müllheim (DE); Hubert Wilbers, Schopfheim (DE); Daniel Baer, Riehen (CH)

(73) Assignee: HUNTSMAN ADVANCED MATERIALS, The Woodlands, TX (US)

( * ) Notice: Subject to any disclaimer, the term of this patent is extended or adjusted under 35 U.S.C. 154(b) by 532 days.

(21) Appl. No.: 16/981,334

(22) PCT Filed: Mar. 14, 2019

(86) PCT No.: PCT/EP2019/056473
§ 371 (c)(1),
(2) Date: Sep. 16, 2020

(87) PCT Pub. No.: WO2019/175342
PCT Pub. Date: Sep. 19, 2019

(65) Prior Publication Data
US 2021/0009803 A1 Jan. 14, 2021

(30) Foreign Application Priority Data
Mar. 16, 2018 (EP) .................................... 18162350

(51) Int. Cl.
*C08L 63/00* (2006.01)
(52) U.S. Cl.
CPC ......... *C08L 63/00* (2013.01); *C08L 2205/025* (2013.01); *C08L 2205/03* (2013.01)
(58) Field of Classification Search
CPC . C08L 63/00; C08L 2205/025; C08L 2205/03
USPC ....................................................... 525/409
See application file for complete search history.

(56) References Cited

U.S. PATENT DOCUMENTS

| | | | |
|---|---|---|---|
| 3,271,509 A | | 9/1966 | Calderwood et al. |
| 5,994,785 A | * | 11/1999 | Higuchi .................. C08L 63/00 525/481 |
| 6,048,946 A | * | 4/2000 | Beisele ................... C08L 63/00 525/426 |
| 2011/0278630 A1 | * | 11/2011 | Urasaki .............. C08G 59/3245 428/413 |
| 2015/0031789 A1 | | 1/2015 | Botti et al. |
| 2017/0355848 A1 | | 12/2017 | Kuhlmann et al. |

FOREIGN PATENT DOCUMENTS

| | | |
|---|---|---|
| EP | 0449776 A2 | 10/1991 |
| EP | 0899304 A2 | 3/1999 |
| EP | 1101783 A2 | 5/2001 |
| EP | 1165688 A1 | 1/2002 |
| EP | 1798740 A1 | 6/2007 |
| EP | 1907436 A1 | 4/2008 |
| JP | H4-359023 A | 12/1992 |
| JP | H9-137041 A | 5/1997 |
| JP | H11-162258 A | 6/1999 |
| JP | 2000-26708 A | 1/2000 |
| JP | 2001-055487 A | 2/2001 |
| JP | 2002-539307 A | 11/2002 |
| JP | 2004-124089 A | 4/2004 |
| JP | 2005-171166 A | 6/2005 |
| JP | 2008-195875 A | 8/2008 |
| JP | 2009-068007 A | 4/2009 |
| KR | 2017-0138945 A | 12/2017 |
| WO | 2007012577 A1 | 2/2007 |
| WO | 2008009560 A1 | 1/2008 |
| WO | 2016130455 A1 | 8/2016 |
| WO | 2017157591 A1 | 9/2017 |

OTHER PUBLICATIONS

Westlake, "Technical Data Sheet EPIKOTE Resin 828", Oct. 23, 2024. (Year: 2024).*
Mitsubishi Chemical Corporation, "jER Epoxy resins", Apr. 2021. (Year: 2021).*
Chinese Office Action issued Sep. 28, 2023, in corresponding Chinese Application No. 2019800198494 (English translation enclosed herewith).
Japanese Office Action issued Aug. 23, 2023, in corresponding Japanese Application No. 2020-572621 (English translation enclosed herewith).
Brazilian Office Action issued Aug. 8, 2023, in corresponding Brazilian Application No. BR 11 2020 018692 9 (English translation enclosed herewith).

* cited by examiner

Primary Examiner — David T Karst

(57) ABSTRACT

Disclosed are a storage stable resin composition, comprising an epoxy resin, a block-copolymer with silicone and organic blocks, and a silane, a process for obtaining such storage stable resin composition, a curable resin composition obtainable from the above storage stable resin composition as well as a cured article obtainable from the latter and uses thereof.

8 Claims, No Drawings

STORAGE STABLE AND CURABLE RESIN COMPOSITIONS

CROSS-REFERENCE TO RELATED APPLICATIONS

This application is a National Stage application filed under 35 U.S.C. § 371 of International Application No. PCT/EP2019/056473 filed Mar. 14, 2019 which designated the United States, and which claims priority to European Application No. 18162350.5 filed Mar. 16, 2018. The noted applications are hereby incorporated herein by reference in their entirety.

TECHNICAL FIELD

The present disclosure is related to storage stable resin compositions, curable resin compositions obtainable therefrom, products obtainable from the latter, and uses thereof.

BACKGROUND

Curable resin compositions are widely known for various purposes. One purpose of high interest is the use of curable resin compositions for electrical applications. For example, electrical devices, such as instrument transformers, switchgears, insulators, bushings or DDTs, are manufactured by automated pressure gelation (APG) and/or vacuum casting processes of curable resin compositions which are then cured under suitable conditions. For such applications, usually fillers are added to the curable resin compositions to obtain the necessary mechanical characteristics.

Another known use of curable resin compositions is for impregnation of paper bushings for high-voltage applications or (vacuum pressure) impregnation of mica-tape used for insulating large generators and motors or of filament windings, e.g. of tubes for hollow core insulators. Such compositions usually do not use fillers.

There are numerous patents and patent applications related to such compositions, for example EP 1 798 740 A1 on resin-impregnated paper (RIP) bushings.

Known systems for the above applications are usually based on epoxy resins. However, sufficient toughness (at comparable high Tg level) is very often a problem.

It is known (for example, from U.S. Pat. No. 6,111,015 A) to use specific core-shell tougheners based on polybutadiene with a polymethylmethacrylate (PMMA) shell. However, such core-shell tougheners are known to only show a thermostability up to thermal class F (according to IEC 60216), and to comprise particles of a size preventing good impregnation of paper or of the windings of ignition coils.

Object of the Disclosure

In view of the drawbacks of the prior art, it is an object of the present disclosure to provide curable resin compositions with improved toughness (at comparable high Tg level) and thermostability and, at the same time, lower viscosity at comparably low costs. For un-filled applications (high-voltage resin impregnated paper bushings and mica-tape applications and filament windings), a higher toughness would also be desirable.

DISCLOSURE

Unless otherwise defined herein, technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference to the extent that they do not contradict the instant disclosure.

All of the compositions and/or methods disclosed herein can be made and executed without undue experimentation in light of the present disclosure. While the compositions and methods of the present disclosure have been described in terms of preferred embodiments, it will be apparent to those having ordinary skill in the art that variations may be applied to the compositions and/or methods and in the steps or sequences of steps of the methods described herein without departing from the concept, spirit, and scope of the present disclosure. All such similar substitutes and modifications apparent to those skilled in the art are deemed to be within the spirit, scope, and concept of the present disclosure.

As utilized in accordance with the present disclosure, the following terms, unless otherwise indicated, shall be understood to have the following meanings.

The use of the word "a" or "an", when used in conjunction with the term "comprising", "including", "having", or "containing" (or variations of such terms) may mean "one", but it is also consistent with the meaning of "one or more", "at least one", and "one or more than one".

The use of the term "or" is used to mean "and/or" unless clearly indicated to refer solely to alternatives and only if the alternatives are mutually exclusive.

Throughout this disclosure, the term "about" is used to indicate that a value includes the inherent variation of error for the quantifying device, mechanism, or method, or the inherent variation that exists among the subject(s) to be measured. For example, but not by way of limitation, when the term "about" is used, the designated value to which it refers may vary by plus or minus ten percent, or nine percent, or eight percent, or seven percent, or six percent, or five percent, or four percent; or three percent, or two percent, or one percent, or one or more fractions therebetween.

The use of "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it refers. In addition, the quantities of 100/1000 are not to be considered as limiting since lower or higher limits may also produce satisfactory results.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The phrases "or combinations thereof" and "and combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms such as BB, AAA, CC, AABB, AACC, ABCCCC, CBBAAA, CABBB, and so forth. The skilled artisan will understand that typically there is no limit on the number of items or terms in any combination, unless otherwise apparent from the context. In the same light, the terms "or combinations thereof" and "and combinations thereof" when used with the phrases "selected from" or "selected from the group consisting of" refers to all permutations and combinations of the listed items preceding the phrase.

The phrases "in one embodiment", "in an embodiment", "according to one embodiment", and the like generally mean the particular feature, structure, or characteristic following the phrase is included in at least one embodiment of the present disclosure, and may be included in more than one embodiment of the present disclosure. Importantly, such phrases are non-limiting and do not necessarily refer to the same embodiment but, of course, can refer to one or more preceding and/or succeeding embodiments. For example, in the appended claims, any of the claimed embodiments can be used in any combination.

The present disclosure is related to a storage stable resin composition, comprising an epoxy resin, a block-copolymer with silicone and organic blocks, and a silane.

In a preferred embodiment, the epoxy resin is a bisphenol-A epoxy resin.

In one embodiment, the storage stable resin composition contains the block-copolymer in an amount of 4 to 8 wt. %, based on the sum of amounts of the epoxy resin, the block-copolymer and the silane.

Preferably, the storage stable resin composition contains the block-copolymer in an amount of 5 to 8 wt. %, more preferably 5.5 to 8 wt. %, based on the sum of amounts of the epoxy resin, the block-copolymer and the silane.

Preferably, the silane is an epoxy silane.

In one embodiment, the storage stable resin composition contains the silane in an amount of 0.6 to 1.5 wt. %, based on the sum of amounts of the epoxy resin, the block-copolymer and the silane.

The present disclosure is also related to a process for obtaining the presently disclosed storage stable resin composition, wherein the epoxy resin is blended with the block-copolymer at a temperature of 80° C. or more, preferably between 8° and 120° C., most preferably between 8° and 100° C. to obtain a blend, the blend is cooled down to a temperature of 60° C. or below, preferably between 60 and 40° C., and then mixed with the silane.

The present disclosure is also related to a curable resin composition comprising the presently disclosed storage stable resin composition and a hardener component.

In a preferred embodiment, the hardener component is based on an anhydride, an amine, a dicyandiamide, or a catalyst that triggers epoxy polymerization.

In one embodiment, the curable resin composition additionally comprises a filler component.

In a preferred embodiment, the curable resin composition comprises the filler component in an amount of 60 to 70 wt. %, based on the sum of amounts of the epoxy resin, block-copolymer, the silane, the hardener and the filler component.

Preferably, the filler component comprises silica, most preferably in a content of 50 to 100 wt. %, or alternatively 50 to 90 wt. %, or alternatively 60 to 90 wt. %, or alternatively to 60 to 70 wt. %, or alternatively 70 to 80 wt %, based on the sum of the constituents of the filler component.

In an even more preferred embodiment, the curable resin composition additionally comprises additives, such as curing accelerators, flexibilizers, coloring agents, anti-settling agents or deforming agents.

The present disclosure also relates to a cured article obtainable by curing the presently disclosed curable resin composition.

The present disclosure is also related to the use of the presently disclosed cured article for electrical applications, such as instrument transformers, switchgears, insulators, bushings, hollow core insulators or dry-type distribution transformers.

The present disclosure is still further related to one or more of an instrument transformer, switchgear, insulator, bushing, hollow core insulator, or dry-type distribution transformer containing a cured article obtained by curing the curable resin composition as disclosed herein.

Moreover, the present disclosure is related to the use of the presently disclosed curable resin composition (without filler) for impregnation of paper bushings for high-voltage applications or for impregnation of mica-tape or filament windings of insulated large generators and motors.

The present disclosure is also related to paper bushings for high-voltage applications and/or mica-tape or filament windings, which have been impregnated with the presently disclosed curable resin composition.

Finally, the present disclosure is related to the use of the curable resin composition as disclosed herein for encapsulation of stators of electrical motors, in particular for use in electric vehicles.

The most important advantage of the present disclosure over the prior art is the greatly reduced simulated crack temperature. This means for a practical application a much better thermal cycle crack resistance.

Besides this main advantage, the compositions of the present disclosure also show a lower viscosity (both with and without filler), a better impregnation performance, and a better thermal aging stability at predictably lower production costs.

The epoxy resin used for the presently disclosed curable resin composition may be any kind of epoxy resin without any specific limitation. The epoxy resin may, for example, be a polyglycidylether, a cycloaliphatic epoxy resin or an N-glycidyl compound.

The polyglycidylether may, for example, be selected from bisphenol-A-diglycidylether, bisphenol-F-diglycidylether, 2,2-bis(4-hydroxy-3-methylphenyl) propane-diglycidylether, bisphenol-E-diglycidylether, 2,2-bis(4-hydroxyphenyl) butane-diglycidyl-ether, bis(4-hydroxyphenyl)-2,2-dichloro-ethylene, bis(4-hydroxyphenyl)diphenylmethane-diglycidylether, 9,9-bis(4-hydroxyphenyl) fluorene-diglycidylether, 4,4'-cyclohexylidenebisphenol-diglycidyl-ether, epoxy phenol novolac, epoxy cresol novolac, or combinations thereof.

The cycloaliphatic epoxy resin may, for example, be selected from bis(epoxycyclohexyl)-methylcarboxylate, bis (4-hydroxy-cyclohexyl) methane-diglycidylether, 2,2-bis(4-hydroxy-cyclohexyl) propane-diglycidylether, tetrahydrophthalicacid-diglycidylester, hexahydrophthalicacid-diglycidylester, 4-methyltetrahydrophthalicacid-diglycidylester, 4-methylhexahydrophthalicacid-diglycidylester, or combinations thereof.

The N-glycidyl compound may be selected, for example, from N,N,N',N'-tetraglycidyl-4,4'-methylene-bis-benzeneamine, N,N,N',N'-tetraglycidyl-3,3'-diethyl-4,4'-diaminodiphenylmethane, 4,4'-methylene-bis [N,N-bis(2,3-epoxypropyl) aniline], 2,6-dimethyl-N,N-bis [(oxiran-2-yl) methyl]aniline, or combinations thereof.

Specifically preferred epoxy resins are polyglycidyl ethers based on bisphenol, such as bisphenol-A-diglycidylether.

Any silane suitable for use with epoxy resins may be incorporated into the composition. Because of specifically high compatibility with the epoxy resin, an epoxy silane may be chosen.

It will become obvious from the examples below that the use of a block-copolymer with silicone and organic blocks (the organic blocks, for example being based on caprolactone or other lactones), such as Genioperl®: W35 (Wacker Chemie AG, Munich, Germany), in combination with at least an epoxy resin and a silane results in a composition having unexpectedly superior results as a storage stable resin.

If a filler is used with the presently disclosed storage stable resin composition, any filler suitable for the respective application is appropriate. Examples are metal powder, wood powder, glass powder, glass spheres, semimetal and metal oxides such as, for example, SiO2 (quartz sand, silica powder, fused silica), aluminum oxide, titanium oxide and zirconium oxide, metal hydroxides such as MgOH2, AlOH3 and AlO(OH), semimetal and metal nitrides such as, for example, silicon nitride, boron nitrides and aluminum nitride, semimetal and metal carbides such as, for example, SiC and boron carbides, metal carbonates such as, for example, dolomite, chalk, CaCO3, metal sulfates such as, for example, baryte and gypsum, stone powders and natural and synthetic minerals, in particular those from the group of silicates, such as, for example, zeolithes (in particular molecular sieves), talcum, mica, kaolin, wollastonite and others.

A filler should, of course, not be used for such uses as impregnation of paper bushings for high-voltage applications or impregnation of mica-tape or filament windings of insulated large generators and motors, as a filler would block pores and prevent effective impregnation.

Additionally, it has been surprisingly found that the presently disclosed composition has unexpectedly superior results when the content of the toughener in the storage stable composition is as set forth below:

Only if a minimum quantity of the block-copolymer is used (4 wt. % or more), a significant effect with respect to, for example, toughness is obtainable.

Only if less than a maximum quantity of the block-copolymer is used (8 wt. % or less), the formulation is storage stable. Otherwise, it would tend to separation.

The results can be optimized by selecting the parameters of the process for obtaining the presently disclosed storage stable resin composition. In particular, blending the epoxy resin and the block-copolymer at an elevated dispersion temperature of 80° C. or more, for example, between 8° and 120° C., most preferably, between 8° and 100° C., results in a specifically stable and homogenous dispersion.

Addition of silane is known to improve the adhesion of the matrix to the filler, however, it appears to be new that the application of silane enhances the effect of the block-copolymer.

The hardener component may be any of this type which is suitable for curing epoxy resin compositions. Examples are compounds based on anhydride, such as methyltetrahydrophthalic anhydride, or amine, such as the JEFFAMINE® polyetheramines available from Huntsman Corp. or an affiliate thereof (The Woodlands, TX), or dicyandiamide ("dicy"), such as Dyhard® 100S from Alzchem (Trostberg, Germany), or on a catalyst, for example a cationic catalyst, such as dibenzylphenylsulfonium-hexafluoroantimonate, that triggers polymerization.

Non-limiting examples of amines suitable as a hardener include include benzenediamine, 1,3-diaminobenzene; 1,4-diaminobenzene; 4,4'-diamino-diphenylmethane; polyaminosulphones, such as 4,4'-diaminodiphenyl sulphone (4,4'-DDS), 4-aminophenyl sulphone, and 3,3'-diaminodiphenyl sulphone (3,3'-DDS); dicyanpolyamides, such as dicyandiamide; imidazoles; 4,4'-methylenedianiline; bis(4-amino-3,5-dimethylphenyl)-1,4-diisopropylbenzene; bis(4-aminophenyl)-1,4-diisopropylbenzene; ethylenediamine (EDA); 4,4'-methylenebis-(2,6-diethyl)-aniline (MDEA); m-xylenediamine (mXDA); diethylenetriamine (DETA); triethylenetetramine (TETA); trioxatridecanediamine (TTDA); 4,4'-methylenebis-(3-chloro,2,6-diethyl)-aniline (MCDEA); 4,4'-methylenebis-(2,6-diisopropyl)-aniline (M-DIPA); 3,5-diethyl toluene-2,4/2,6-diamine (D-ETDA 80); 4,4'-methylenebis-(2-isopropyl-6-methyl)-aniline (M-MIPA); 4-chlorophenyl-N,N-dimethyl-urea; 3,4-dichlorophenyl-N,N-dimethyl-urea; 9,9-bis(3-methyl-4-aminophenyl) fluorene; 9,9-bis(4-aminophenyl) fluorene; diaminocyclohexane (DACH), isophoronediamine (IPDA); 4,4'-diamino dicyclohexyl methane; bisaminopropylpiperazine; and N-aminoethylpiperazine.

Non-limiting examples of anhydrides suitable as a hardener include polycarboxylic anhydrides, such as nadic anhydride, methylnadic anhydride, phthalic anhydride, tetrahydrophthalic anhydride, hexahydrophthalic anhydride, methyltetrahydrophthalic anhydride, methylhexahydrophthalic anhydride, endomethylenetetrahydrophthalic anhydride, hexachloroendomethylene-tetrahydrophthalic anhydride, trimellitic anhydride, pyromellitic dianhydride, maleic anhydride, succinic anhydride, nonenylsuccinic anhydride, dodecenylsuccinic anhydride, polysebacic polyanhydride, and polyazelaic polyanhydride.

More details and advantages will become obvious from the following examples. The components used therein, which are all available from Huntsman Corp. or an affiliate thereof (with exceptions as indicated), are as follows:

Araldite® MY 740 resin: bisphenol-A diglycidylether epoxy resin with an epoxy equivalent weight of 180-190 g/eq.

Araldite® CY 5995 resin: bisphenol-A diglycidylether epoxy resin containing a core-shell toughener based on polybutadiene with a PMMA shell.

Aradur® HY 918-1 hardener: Anhydride hardener consisting of various isomers of methyltetrahydrophthalic anhydride.

Accelerator DY 070 accelerator: 1-methyl-imidazole-Silica

Silbond W12 silica: silica flour with an average particle size of 16 μm (supplier: Quarzwerke GmbH, Frechen, Germany)

Silquest® A-187 silane: [3-(2,3-epoxypropoxy) propyl] trimethoxysilane (supplier: Momentive Performance Materials, Albany, NY)

Genioperl® W35: block-copolymer with silicone and organic blocks (supplier: Wacker Chemie AG, Munich, Germany)

Ba 3579-3: Pre-mixture of 82 pbw of Aradur HY 918-1 and 0.5 pbw of Accelerator DY 070

Comparative Example 1

100 g of Araldite® CY 5995 resin were mixed with 82.5 g of Bä 3579-3 at 50-60° C. with a blade agitator for 5 min.

Then, 274 g of Silbond W12 silica were added in portions while heating up the mixture to about 60° C. within 10 min. Finally, the mixture was degassed under vacuum.

The viscosity of the mixture was measured at 60 and 80° C.

After degassing, the reaction mass was then poured into a mold (preheated to 100° C.) to prepare plates for the mechanical test. The mold was put to an oven for 2 hours at 100° C. and 16 hours at 140° C.

After cooling and demoulding, the plates were machined into test specimens and subjected to determine the mechanical parameters (tensile test, toughness, coefficient of thermal expansion (CTE) and Tg (via Differential Scanning calorimetry (DSC) according to ISO 11357-2).

Comparative Example 2

100 g of Araldite® MY 740 resin were mixed with 85 g of Ba 3579-3 at 50-60° C. with a blade agitator for 5 min. Then, 278 g Silbond® W12 silica were added in portions while heating up the mixture to about 60° C. within 10 min. Finally, the mixture was degassed under vacuum.

After degassing, the reaction mass was then poured into a mold (preheated to 100° C.) to prepare plates for the mechanical test. The mold was put to an oven for 2 hours at 100° C. and 16 hours at 140° C.

After cooling and demolding, the plates were machined into test specimens and subjected to determine the mechanical parameters (tensile test, toughness, CTE and Tg (via DSC) according to ISO 11357-2).

Comparative Example 3

94 g of Araldite® MY 740 resin were mixed 6 g of Genioperl® W 35 at 90° C. with a blade mixer for 15 min.

Then, the mixture was cooled down to 60° C. and 85 g of Ba 3579-3 were added and mixed at 60° C. with a blade agitator for 5 min.

Then, 278 g of Silbond W12 silica was added in portions while heating up the mixture to about 60° C. within 10 min. Finally, the mixture was degassed under vacuum.

After degassing, the reaction mass was then poured into a mold (preheated to 100° C.) to prepare plates for the mechanical test. The mold was put to an oven for 2 hours at 100° C. and 16 hours at 140° C.

After cooling and demolding, the plates were machined into test specimens and subjected to determine the mechanical parameters (tensile test, toughness, CTE and Tg (via DSC) according to ISO 11357-2).

Comparative Example 4

99 g of Araldite® MY 740 resin was mixed 1 g of Silquest® A-187 silane at 60° C. with a blade mixer for 15 min. Then 85 g of Bä 3579-3 were added and mixed at 60° C. with a blade agitator for 5 min.

Then, 278 g of Silbond W12 silica were added in portions while heating up the mixture to about 60° C. within 10 min. Finally, the mixture was degassed under vacuum.

After degassing, the reaction mass was then poured in a mold (preheated to 100° C.) to prepare plates for the mechanical test. The mold was put to an oven for 2 hours at 100° C. and 16 hours at 140° C.

After cooling and demolding, the plates were machined into test specimens and subjected to determine the mechanical parameters (tensile test, toughness, CTE and Tg (via DSC) according to ISO 11357-2).

EXAMPLE 1

93 g of Araldite® MY 740 resin were mixed with 6 g of Genioperl® W 35 at 90° C. with a blade mixer for 15 min.

Then, the mixture was cooled down to 60° C. and 1 g of Silquest® A-187 silane was added and mixed in with a blade mixer for 5 min.

Then, 85 g of Ba 3579-3 were added and mixed at 60° C. with a blade agitator for 5 min.

Then, 278 g Silbond W12 silica were added in portions while heating up the mixture to about 60° C. within 10 min. Finally, the mixture was degassed under vacuum.

The viscosity of the mixture was measured at 60 and 80° C.

After degassing, the reaction mass was then poured into a mold (preheated to 100° C.) to prepare plates for the mechanical test. The mold was put to an oven for 2 hours at 100° C. and 16 hours at 140° C.

After cooling and demolding, the plates were machined into test specimens and subjected to determine the mechanical parameters (tensile test, toughness, CTE and Tg (via DSC) according to ISO 11357-2).

Comparative Example 5

93.5 g of Araldite® MY 740 resin were mixed 6 g of Genioperl® W 35 at 90° C. with a blade mixer for 15 min.

Then, the mixture was cooled down to 60° C. and 0.5 g of Silquest® A-187 silane was added and mixed in with a blade mixer for 5 min.

Then, 85 g of Ba 3579-3 were added and mixed at 60° C. with a blade agitator for 5 min.

Then, 278 g of Silbond W12 silica were added in portions while heating up the mixture to about 60° C. within 10 min. Finally, the mixture was degassed under vacuum.

After degassing, the reaction mass was then poured into a mold (preheated to 100° C.) to prepare plates for the mechanical test. The mold was put to an oven for 2 hours at 100° C. and 16 hours at 140° C.

After cooling and demolding, the plates were machined into test specimens and subjected to determine the mechanical parameters (tensile test, toughness, CTE and Tg (via DSC) according to ISO 11357-2).

COMPARATIVE EXAMPLE 6

96 g of Araldite® MY 740 resin were mixed with 3 g of Genioperl® W 35 at 90° C. with a blade mixer for 15 min.

Then, the mixture was cooled down to 60° C. and 1 g Silquest® A-187 silane was added and mixed in with a blade mixer for 5 min.

Then 85 g of Bä 3579-3 were added and mixed at 60° C. with a blade agitator for 5 min.

Then, 278 g of Silbond W12 silica were added in portions while heating up the mixture to about 60° C. within 10 min. Finally, the mixture was degassed under vacuum.

After degassing, the reaction mass was then poured into a mold (preheated to 100° C.) to prepare plates for the mechanical test. The mold was put to an oven for 2 hours at 100° C. and 16 hours at 140° C.

After cooling and demolding, the plates were machined into test specimens and subjected to determine the mechanical parameters (tensile test, toughness, CTE and Tg (via DSC) according to ISO 11357-2).

Comparative Example 7

96.5 g of Araldite® MY 740 resin were mixed with 3 g of Genioperl® W 35 at 90° C. with a blade mixer for 15 min.

Then, the mixture was cooled down to 60° C. and 0.5 g of Silquest® A-187 silane was added and mixed in with a blade mixer for 5 min.

Then, 85 g of Bä 3579-3 were added and mixed at 60° C. with a blade agitator for 5 min.

Then, 278 g of Silbond W12 silica were added in portions while heating up the mixture to about 60° C. within 10 min. Finally, the mixture was degassed under vacuum.

After degassing, the reaction mass was then poured into a mold (preheated to 100° C.) to prepare plates for the mechanical test. The mold was put to an oven for 2 hours at 100° C. and 16 hours at 140° C.

After cooling and demolding, the plates were machined into test specimens and subjected to determine the mechanical parameters (tensile test, toughness, CTE and Tg (via DSC) according to ISO 11357-2).

The parameters and results of the examples are summarized in the table below.

The simulated crack temperature was calculated in the same way as explained in EP 1 165 688 A1. The formula is:

$$RI = -498.08 \cdot Z^{0.18480890} \cdot G^{0.194114601} \cdot (A-18)^{-0.391334273} \cdot T^{-0.158387791} + 224.25$$

RI=simulated crack temperature in ° C.
Z=elongation at break in %
G=$G_{IC}$ in J/m²;
A=CTE in ppm/K
T=Tg in ° C.

From the results as listed in the table the following benefits of the presently disclosed resin composition become apparent:

(1) Much lower viscosity of the presently disclosed resin composition (1700 mPas at 40° C.) compared to Araldite® CY 5995 resin (8000 mPas at 40° C.).
(2) The most important advantage of the inventive example over the non-inventive examples is the greatly reduced simulated crack temperature. This means for a practical application a much better thermal cycle crack resistance.
(3) Lower viscosity of the presently disclosed formulation containing filler compared to one based on Araldite® CY 5995 resin. This would allow to even use more filler and thus reduce costs.
(4) Better impregnation performance allowing to apply this toughening concept also to vacuum pressure impregnation (VPI) bath resins for large generators and motors (LGM) or impregnation systems for RIP or for impregnation systems for ignition coils, where Araldite® CY 5995 resin could not be used, because the core-shell toughener blocks the impregnation of the coil windings.
(5) More reasonable production costs of the toughened resin because of no need for distilling off the water as in the process for manufacturing Araldite® CY 5995 resin (see U.S. Pat. No. 6,111,015).
(6) Better thermal aging stability (class H according to IEC 60216 or even better).

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

|  |  | Comparison 1 | Comparison 2 | Comparison 3 | Comparison 4 | Example 1 | Comparison 5 | Companion 6 | Comparison 7 |
| --- | --- | --- | --- | --- | --- | --- | --- | --- | --- |
| Araldite ® CY 5995 | pbw | 100 | — | — | — | — | — | — | — |
| Araldite ® MY 740 | pbw | — | 100 | 94 | 99 | 98 | 99.5 | 96 | 96.5 |
| Genioperl ® W 35 | pbw | — | — | 6 | — | 6 | 6 | 3 | 3 |
| Silquest ® A-187 Silane | pbw | — | — | — | 1 | 1 | 0.5 | 1 | 0.5 |
| Ba 3579-3 (82 pbw 918-1/0.5 pbw 070) | pbw | 87.5 | 85 | 85 | 85 | 85 | 85 | 85 | 85 |
| Silbond W12 silica | pbw | 274 | 279 | 278 | 278 | 278 | 278 | 278 | 278 |
| Viscosity |  |  |  |  |  |  |  |  |  |
| at 60° C. | mPa s | 3120 |  |  |  | 2970 |  |  |  |
| at 80° C. | mPa s | 1150 |  |  |  | 990 |  |  |  |
| Curing: 2 h 100° C. + 16 h 140° C. | | | | | | | | | |
| Tensile strength | MPa | 85 | 66 | 68 | 78 | 78 | 79 | 74 | 74 |
| E-module from tension | MPa | 8810 | 8825 | 8070 | 8385 | 8870 | 8728 | 8240 | 8465 |
| Elongation at rupture | % | 1.5 | 0.9 | 1.1 | 1.2 | 1.4 | 1.1 | 1.2 | 1.1 |
| Double torsion |  |  |  |  |  |  |  |  |  |
| Critical stress intensity factor (K + C) | mPa · m½ | 2.2 | 1.9 | 1.3 | 2.4 | 2.8 | 2.4 | 2.2 | 2.3 |
| Specific fracture energy (G + C) | J/m² | 489 | 346 | 559 | 594 | 831 | 583 | 489 | 557 |
| Tg (1st/2nd run) | ° C. | 143/144 | 145/146 | 143/143 | 146/146 | 139/140 | 141/143 | 146/147 | 141/143 |
| Simulated crack temperature | ° C. | −24 | 6 | −25 | −31 | −58 | −28 | −22 | −25 |

The invention claimed is:

1. A storage stable resin composition, comprising an epoxy resin, a hardener, a block-copolymer with silicone and organic blocks based on caprolactone or other lactones, and an epoxy silane, wherein the composition contains the block-copolymer in an amount ranging from 4 to 8 wt. % and the epoxy silane in an amount ranging from 0.6 to 1.5 wt. %, based on the total weight of the epoxy resin, the block-copolymer and the epoxy silane; and wherein the epoxy resin is bisphenol-A diglycidyl ether epoxy resin with an epoxy equivalent weight of 180-190 g/eq, wherein the hardener component is an anhydride or amine, and wherein the epoxy silane comprises [3-(2,3-epoxypropoxy) propyl] trimethoxysilane.

2. A process for obtaining the storage stable resin composition of claim 1, comprising:
   blending the epoxy resin with the block-copolymer at a temperature of 80° C. or more to obtain a blend,
   cooling the blend to a temperature of 60° C. or below, and mixing the blend with the epoxy silane.

3. A curable resin composition comprising the storage stable resin composition according to claim 1.

4. The curable resin composition according to claim 3, wherein the curable resin composition further comprises a filler component.

5. The curable resin composition according to claim 4, wherein the filler component comprises silica.

6. The curable resin composition according to claim 5, wherein silica is present in the filler component in an amount ranging from 50 to 100 wt. %, based on the total weight of the filler component.

7. A cured article obtainable by curing the curable resin composition according to claim 3.

8. The storage stable resin composition of claim 3 wherein the composition further comprises a thermal aging stability of Class H according to IEC 60216 or greater.

* * * * *